US012777050B1

(12) United States Patent
Trajanovski et al.

(10) Patent No.: US 12,777,050 B1
(45) Date of Patent: Oct. 27, 2026

(54) MALICIOUS THREAT DETERMINATION BY A MODEL

(71) Applicant: Amazon Technologies, Inc., Seattle, WA (US)

(72) Inventors: Tolijan Trajanovski, London (GB); Sidharth Ramesh, London (GB); Andrew Robert Hassall, Bristol (GB); Thomas William Bray, Bristol (GB); Zakhar Tyrkov, Berlin (DE); Grace Marie Hatamyar, Bristol (GB); Sadiq Abubakar Sani, London (GB); Bryn Elyse Albertson-Gass, Seattle, WA (US); Affan Ahmad Fahmi, Dublin (IE); Soma Halder, West Bengal (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/787,693

(22) Filed: Jul. 29, 2024

(51) Int. Cl.
*H04L 9/40* (2022.01)

(52) U.S. Cl.
CPC ...... *H04L 63/1416* (2013.01); *H04L 63/0236* (2013.01)

(58) Field of Classification Search
CPC ........................ H04L 63/1416; H04L 63/0236
See application file for complete search history.

(56) References Cited

U.S. PATENT DOCUMENTS

| | | | | |
|---|---|---|---|---|
| 9,483,742 | B1 * | 11/2016 | Ahmed | H04L 63/1441 |
| 10,505,986 | B1 * | 12/2019 | Messick | H04L 63/1416 |
| 11,363,037 | B2 * | 6/2022 | Karin | H04L 63/1416 |
| 2014/0068775 | A1 * | 3/2014 | Ward | H04L 63/1425 726/24 |
| 2019/0387005 | A1 * | 12/2019 | Zawoad | H04L 61/4511 |

* cited by examiner

*Primary Examiner* — Esther B. Henderson
(74) *Attorney, Agent, or Firm* — Eversheds Sutherland (US) LLP

(57) ABSTRACT

Techniques for a service provider network to automatically mitigate malicious activity by an internet protocol (IP) address in a cloud computing environment are discussed herein. A system can detect malicious data hosted by the IP address and determine whether or not to allow subsequent data exchanges by the IP address. In some examples, the system can validate an impact to a resource, a service, a network, or other entity of a service provider in the cloud computing environment. The system can determine whether to block the IP address based on the validated impact to the resource, the service, the network, or the entity. The system can determine an action for a particular IP address to reduce or eliminate exploitation, disruption, and/or data theft, by a threat actor hosting a botnet attack.

20 Claims, 7 Drawing Sheets

MALICIOUS THREAT DETERMINATION BY A MODEL

BACKGROUND

Cloud-based computing environments may provide many different types of services to subscribers, such as on-demand computing services, data-management services, software-execution services, application-hosting services, and various other types of services. Due to the ease of having the serverless computing environment provide and manage the computing infrastructure on behalf of subscribers, users continue to utilize cloud-based networks to provide and/or host services that are accessible over the Internet.

A service may be employed to mitigate security exploits and cyberattacks directed to stealing and destroying computer resources, data, and private information. Some attacks are carried out using "malware", or malicious software. "Malware" refers to a variety of forms of hostile or intrusive computer programs that can disrupt computer operations or access sensitive information stored on a computer (e.g., viruses, worms, Trojan horses, ransomware, and the like). Detecting different forms of malware is time-consuming and resource-intensive particularly when multiple computers work together by playing different roles in a coordinated attack such as a botnet attack targeting the cloud-based computing environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
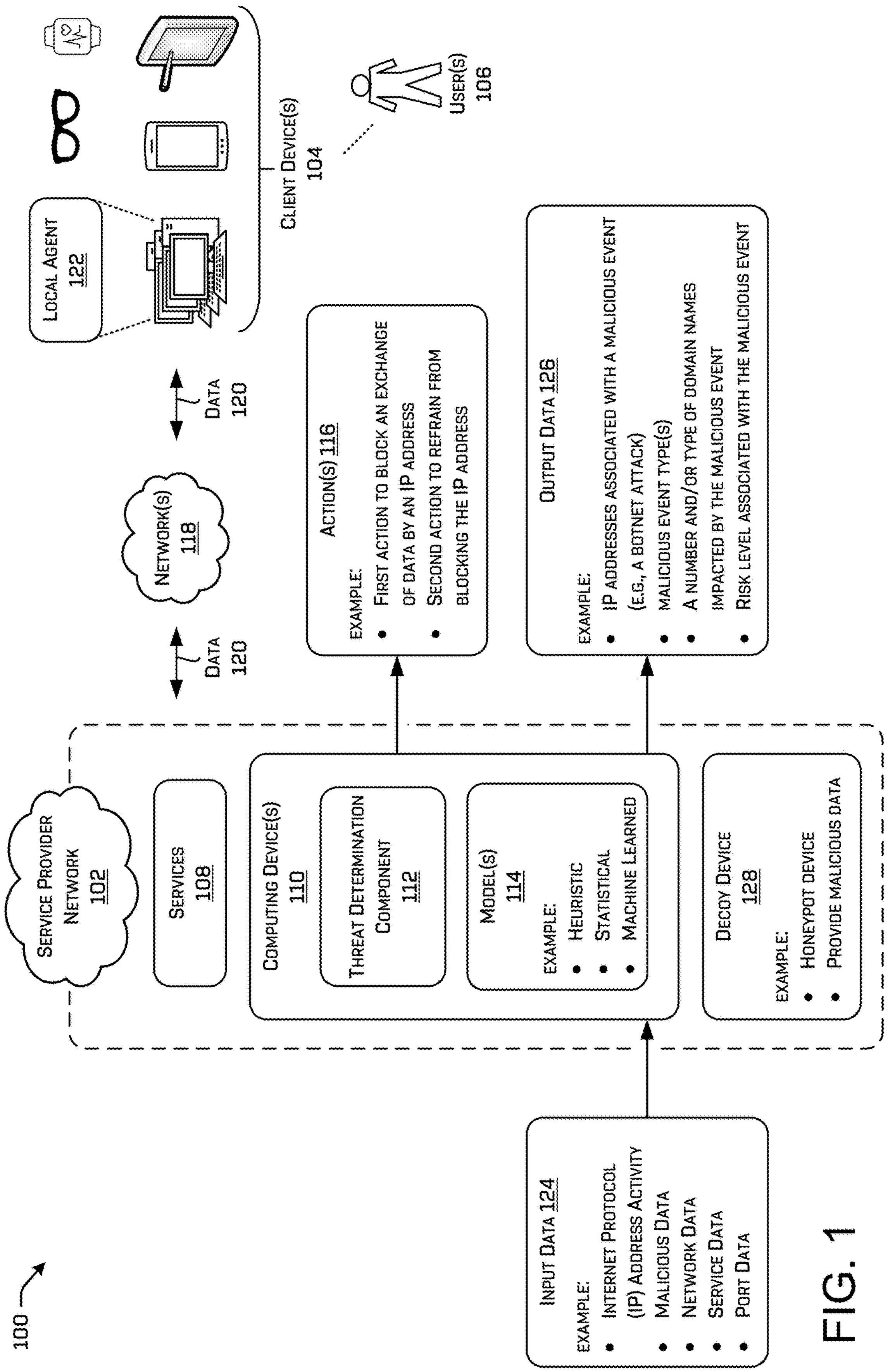
FIG. 1 illustrates a system-architecture diagram of an example environment for identifying and mitigating malicious threats associated with a service provider network.

This disclosure relates to techniques for automatically mitigating malicious activity by an internet protocol (IP) address in a cloud computing environment. For example, a service provider network can implement a system to identify an IP address hosting malicious activity and determine whether or not to allow subsequent data exchanges by the IP address. The system can, for example, determine a type of malicious attack and/or a number of entities (e.g., services, accounts, domain names, etc.) associated with the IP address over a time period. The system can also or instead predict a level of impact on other IP addresses if the IP address hosting the malicious activity were blocked at a future time. In some examples, the system can determine an action to remedy the malicious activity based on the type of malicious attack, the number of entities affected, and/or the predicted level of impact to another device, another IP address, etc. By implementing the techniques described herein, the system can proactively identify actions that reduce or eliminate an impact caused by the malicious activity to various computing devices independent of requiring the computing devices to download computer-readable instructions or providing user verification.

Generally, the techniques can include IP addresses that are initiating, storing, and/or transmitting malicious data. For instance, mitigating an IP address can include identifying a defense strategy, modifying a network setting to "block" one or more of the IP addresses, and so on. In some examples, the system can identify IP addresses storing and/or transmitting data representing a botnet attack against a service provider network (e.g., also referred to as a cloud provider) or devices associated therewith such as computing devices that may or may not be a customer of the service provider network. The system can, in various examples, validate which types of malicious activity are associated with respective IP addresses of a botnet infrastructure The system can also or instead determine whether or not to "block" (e.g., prevent from exchanging data at a future time) a respective IP address based on analyzing which domain names, services, or the like that are associated with each respective IP address. Additional discussion of the system analyzing and validating malicious activity is included throughout this disclosure including in FIGS. 2 and 3 below.

In some examples, the system can identify malicious data such as a botnet attack on a resource or entity associated with a service provider. The botnet attack can represent two or more IP addresses that collectively transmit and/or store malicious data representing computer readable instructions that cause malicious activity. For example, a sensor, decoy device, or the like can be configured to collect data from one or more threat actors. In various examples, the service provider can employ a honeypot network to collect and report malicious activity occurring in association with the sensor, the decoy device, etc. over a time period. The honeypot network can, for example, collect, gather, generate, or otherwise determine malicious information associated with various IP addresses that have stored the malicious data at a previous time, currently storing the malicious data, previously transmitted the malicious data, currently transmitted the malicious activity, etc. The malicious information can include a time that a respective IP address included the malicious data, a malicious type, a source IP address, a target device or target IP address, etc.

In various examples, the honeypot network (or decoy devices thereof) can send the malicious information to a computing device of the service provider for determining an action for the various IP addresses that have or are storing and/or transmitting the malicious data. The computing device can, for example, determine the action based on analyzing the malicious information which may further include accessing a list, file, record, or the like from a storage device. The computing device can output, for example, a first action to "block" a particular IP address while a second action can include refraining from blocking the particular IP address. In various examples, the action may be determined based at least in part on the type of malicious activity, the domain names associated with an IP address, and/or a level of impact associated with the IP address if blocked.

In various examples, the computing device can determine an action that prevents a resource (e.g., a service, a computing device, a network element, a server, another IP address, and so on) of the service provider from receiving or transmitting the malicious data (e.g., pre-emotively precludes the ability of another device to download the malicious data.) For example, the computing device can be used to mitigate different types of malicious data, which may include not taking an action for certain malicious attack types. Types of malicious data can include but not be limited to: a denial of Service (DoS) attack, a botnet attack, crypto-mining, proxy attacks, or the like. Various attack types and other information about the malicious activity can be included as input data to the computing device. For example, the system can identify whether the malicious activity aims to exploit data, deny a service, and so on, and consider the malicious type when outputting the action. Based on the type of malicious data identified and/or the predicted level of impact, the system can determine whether or not to "block" one or more of the detected IP addresses to reduce or eliminate the impact of the malicious activity. By using the techniques described herein, a malicious attack against resources on the Internet can be mitigated at least by preventing a computing device (e.g., a server) from downloading malicious data. In various examples, the computing device can prevent the malicious data from being transmitted at various points or entities of the service provider network thereby protecting devices downstream using the service provider network. The techniques can, for instance, be performed to protect downstream IP addresses, computing device, etc. (e.g., relative to a source of the malicious data) regardless of whether a particular IP address is associated with a customer of the service provider.

In various examples, the action to remedy or mitigate an IP address associated with malicious activity can include modifying a setting of an entity within the service provider network. For example, a service provider can implement a computing device to change or verify a setting of a network element to cause the IP address to be blocked by the network element. The network element can, for example, represent a server, a computing device, a node, a router, an access point, or other entity that facilitates an exchange of data between the IP address and another computing device(s). In some examples, the network element can represent a server of the service provider network recognizes and that blocks the IP address from sending and/or receiving data with the other computing device(s).

The system can, for example, analyze the IP addresses currently or previously hosting the malicious data, and predict a level of impact to a computing device, network element, service, etc. caused by the IP address from the honeypot network based on the analysis. For example, a potential impact to a computing device(s) (or the domain names associated therewith) that are accessing, or have accessed the IP address within a threshold amount of time prior to the malicious data originating on a respective IP address can be determined. The predicted level of impact may also or instead relate to a predicted disruption to a client device (e.g., a customer device), server, service, data center, content delivery network (CDN), or the like from exchanging data with the IP address. Based on the predicted level of impact, the system can determine whether or not to "block" one or more of the detected IP addresses to reduce or eliminate the impact of the malicious activity.

By way of example and not limitation, a threat actor can cause malicious data to be stored on a decoy device and/or on a computing device that receives a service from the service provider in a cloud computing environment. In some examples, the system may provide the service to various client devices located in different geographical locations. The techniques described herein can be used to identify and mitigate malware hosted by the system and/or the client devices to ensure that the service does not inadvertently or unnecessarily block an IP address resulting in a greater disruption than the disruption caused by the malicious activity. Because some devices may be unaware of the malicious activity for a period of time until a threat report is generated, the techniques described herein enable automatically determining which IP addresses to block or not block independent of user verification to minimize the overall disruption to the service provider network. The system can also generate actions that reduce or eliminate instances in which IP addresses are blocked from exchanging data.

In some examples, the system can determine whether to block malicious data from being transmitted among portions of a service provider network (e.g., a particular IP addresses, computing device, network elements, etc.) The system can determine which IP addresses are "safe" to block without causing a further disruption to client devices and other computing devices that are not clients or customers of the service provider network.

The system can detect and mitigate IP addresses associated with malicious data at a particular server, geographic region, a CDN, etc. to control an impact of the IP address. The system can, in some examples, detect and control malicious activity hosted on a cloud server, and determine an action to protect client devices and other devices such as non-client devices associated with the cloud server. Thus, the system can consider whether blocking the cloud server causes a larger impact than an impact caused by the malicious activity hosted by the cloud server. In examples when the cloud server represents an authorized or "legitimate" file sharing website, the techniques can be used to avoid blocking data transmissions at the cloud server that would otherwise disrupt file sharing that is not affected by the malicious data.

The service provider network may comprise clusters of managed servers stored in data centers located across geographic areas. The service provider network may be a distributed network through which users (often customers) may interact via respective client devices to manage or otherwise interact with services provided by the service provider network, including employing a security service to detect malicious events (e.g., an unauthorized request to access a portion of a client device, computing device, a database, or the like).

The system can represent or otherwise utilize a cloud platform that provides or hosts various types of services (also referred to as backend service). For instance, backend services may include business-application services, financial-institution services, healthcare services, and so forth. Client devices often interact or access these backend services over a network, such as the Internet, using Application Program Interface (API) calls that define an operation or interaction that the client device is requesting to be performed. For example, an application or agent may be running locally on a client device to watch a video, make a purchase, etc. Data associated with the cloud platform can be used as input data to one or more models as described herein.

The system can employ a variety of different models to perform the techniques described herein. As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein can improve functioning of a computing device in a variety of ways. For example, the computing device can implement a model or component to reduce an amount of data transmitted over a network to manage actions associated with an IP address hosting malicious data. The techniques described herein can improve the quality of data transmitted using the service provider network by identifying and mitigating malicious activity associated with various IP addresses. For example, actions for responding to various types of malicious activity can include a blocking action to free up network resources, computational resources (e.g., memory resource and/or processor resource allocation and/or usage), or the like that would otherwise be used to exchange the malicious activity between devices and associated IP addresses. Outputs (e.g., actions) by the computing device can be generated in less time and provide more accurate actions to mitigate specific malicious attacks compared to not implementing the model or components and/or relying on human input to validate such malicious attacks. In some examples, network efficiency can be improved by avoiding a blocking action that would otherwise prevent efficient data exchanges used for legitimate purposes (e.g., data exchanges that do not include malicious activity or the malicious activity is not causing an impact to justify blocking an IP address).

The techniques can improve functioning of a variety of different types of computing devices in a cloud computing environment. For example a system can determine a portion of a service provider network to block an IP address by controlling access to network elements, servers, client devices, or other entities within the service provider network. In various examples, blocking an IP address can occur at a "perimeter" of the network to avoid the IP address from sharing potentially malicious activity via the service provider network. The techniques can protect the entities and computing devices both inside and outside of the service provider network by preventing certain malicious activity from being shared in the future. Some computing devices may be prevented from accessing the malicious data without being aware of an IP address being blocked upstream or downstream.

In some examples, the techniques can be used to reduce an amount of malicious data transmitted over a network (e.g., data associated with a botnet attack) by determining which IP addresses to enable data exchanges thereby optimizing use of available network bandwidth and/or computational resources. For instance, the techniques can improve network efficiency by blocking malicious data from using network, memory, or processing resources of a service provider network (e.g., save network bandwidth, free up memory and/or processor resources, etc.). By way of example and not limitation, an IP hosting malware can be blocked at a point within the service provider network to prevent network resources from exchanging or otherwise receiving the malware.

Certain implementations and examples of the disclosure will now be described more fully below with reference to the accompanying figures, in which various aspects are shown. However, the various aspects may be implemented in many different forms and should not be construed as limited to the implementations set forth herein. The disclosure encompasses variations of the examples, as described herein. Like numbers refer to like elements throughout.

FIG. 1 illustrates a system-architecture diagram of an example environment 100 for identifying and mitigating malicious threats associated with a service provider network. For example, a service provider network 102 can identify IP addresses associated with a botnet attack, and further determine which IP addresses to prevent from exchanging data with another device (or IP address) in the future. In some examples, the service provider network 102 can implement a system to validate an impact of different types of botnet threats and verify whether to block or reduce an amount of data exchanged between the IP address and another IP address.

The service provider network 102 can operate at least in part to exchange data (e.g., audio, video, text, or other content) with one or more client devices 104 (also referred to as "the client device 104" or "the client devices 104"). In various examples, the client device(s) 104 can be associated with one or more users(s) 106. The client device(s) 104 may represent any type of computing device capable of connecting to the service provider network 102 via a suitable data communications network(s) (including in some examples a third-party network) such as, but not limited to, a laptop or desktop computer, a tablet computing device, a television, a server computer, a vehicle, a watch, a wearable device (sunglasses), or a mobile telephone, just to name a few.

In some examples, the environment 100 can include a decoy device 128 that is managed by the service provider network 102 and configured to collect malicious data by "acting" as a target device to a threat actor in a "honeypot network". For example, one or more decoy devices can be deployed by the service provider network 102 in one or more geographic locations to transmit malicious data to the system for analysis. The decoy devices can exchange data with a threat actor using a network that is isolated from the client device(s) 104 or other third-party device (e.g., to prevent the decoy device from transmitting data to the client device or other device associated with the service provider network 102. In some examples, the decoy devices can identify candidate IP addresses for processing by the computing device(s) 110 which can determine various actions for one or more of the candidate IP addresses.

In various examples, the decoy device can be configured to receive the malicious activity using a first network of the service provider network that is isolated or otherwise different from a second network of the service provider network that is configured to transmit data to a computing device (e.g., as with an account with the service provider). The first network can, for example, be communicatively independent of the second network (e.g., the first network can exchange data with the decoy devices without affecting data exchanges on the second network). In this way, communications over the first network can enable detection and mitigation of the malicious activity prior to the malicious activity impacting operation of the computing device or otherwise using the second network.

FIG. 1 further illustrates the service provider network 102 comprising services 108 and one or more computing devices 110 (also referred to as "the computing device 110" or "the computing devices 110") that further comprise a threat determination component 112 and one or more models 114. In some examples, the computing device 110 can be configured to determine one or more actions 116 (also referred to as "the action 116" or "the actions 116") for an IP address that initiated or propagated the botnet attack. In some examples, the computing device 110 can identify an action to resolve a level of impact to the service provider network 102 (or portion thereof) caused by the botnet attack. In some examples, the action can include taking no action due in part because a blocking action would cause a greater impact to devices associated with customers and non-customers (e.g., prevents all data traffic) versus a relatively smaller level of impact caused by the botnet attack.

In some examples, the computing device(s) 110 can exchange (e.g., send or receive) data 120 representing events, activity, and/or data transactions with the client device(s) 104 via one or more communication networks 118. The data 120 can, for example, represent activity by an IP address over a time period (e.g., a read request, a write request, or other action for a data packet), which may include first data for detecting malicious activity or second data representing malicious activity determined by another model or component. In some examples, the client device(s) 104 can include a local agent 122 representing an interface for interacting with the user 106 (e.g., outputting data for presentation, receiving data from the user 106, and so on).

Generally, the user(s) 106 may interact via the local agent 122 to receive or employ (e.g., by exchanging the data 120) a service from the services 108. The user(s) 106 may be one or more of individual users, groups of users, organizations, businesses, or other entities that interact with the service provider network 102 via respective client device(s) 104. In some examples, the local agent 122 can represent software that is associated with the services 108. The local agent 122 may also, or instead, represent a user interface having one or more controls (or input controls) for the user 106 to provide input usable by the threat determination component 112 to generate, update, or otherwise output determinations of malicious activity associated with the service provider network 102. For instance, the user 106 can provide input to one or more controls of the local agent 122 to log into a service and/or provide preferences related to a presentation (e.g., as the data 120) on a display device of the device 104.

In various examples, the user(s) 106 of the service provider network 102 may subscribe for an account with the service provider network 102 to utilize the computing infrastructure (e.g., computing resources in data centers) supporting the services 108 (e.g., memory, processing power, auto-scaling, networking and content delivery, etc.) provided for and managed by the service provider network 102. The service provider operating the service provider network 102 may charge a fee for utilization of the computing resources to a subscriber that have computing resources provisioned to support and use the services 108.

In some examples, the service provider network 102 may comprise clusters of managed servers stored in data centers located across geographic areas. The service provider network 102 may be a distributed network through which users (often customers) may interact via the client device(s) 104 to manage or otherwise interact with services 108 provided by the service provider network 102. The service provider network 102 may be managed by a service provider, and may provide various types of services 108, such as a video service, an on-demand computing service, a message-queuing service, a managed-database service, a software-execution service, application-hosting services, business-application services, financial-institution services, and/or other services. The services 108 may be a collection of computing resources configured to instantiate VM instances, containers, network functions, etc., and to provide other types of computing resources on demand. Other applications for the services 108 may be to support database applications, electronic commerce applications, business applications and/or other applications. The services 108 may include a service that configures data for different devices to receive social media content, and the computing device(s) 110 can identify which actions are appropriate for various types of intrusions by a threat actor before, during, and/or after transmitting the data 120 associated with the social media content.

The services 108 may be provided in one particular implementation by one or more data centers operated by the service provider. As known to those skilled in the art, data centers are facilities utilized to house and operate computing resources, such as computer systems and associated components. Data centers may also include redundant power, communications, cooling, and security systems. The data centers might be located in geographically disparate regions, and might also be connected to various other facilities, such as co-location facilities, and various wide area networks ("WANs"), such as the Internet.

The computing resources associated with the services 108 can be provisioned and de-provisioned as needed in an automated fashion. For example, the service provider network 102 might be configured to instantiate a new instance of a computing resource, such as a VM instance, in response to an increase in demand for a network service or other condition. Other types of computing resources might also be provisioned and de-provisioned in a similar manner. Services 108 in the service provider network 102 might also provide functionality for automatically scaling and/or descaling the computing resources based upon demand for the resources and/or other factors.

In some examples, an administrative user employed by the operator of the service provider network 102, such as an engineer, administrator, etc. managing the operation of the service provider network 102 may connect with, manage, and/or utilize resources provided by the service provider network 102 (e.g., using the computing device(s) 110).

The computing device(s) 110 can implement the threat determination component 112 and/or the model(s) 114 to determine nd analyze malicious data stored and/or transmitted by the decoy device 128, the client device 104, or other device. The computing device(s) 110 can, in some examples, employ the threat determination component 112 and/or the model(s) 114 to validate an impact of the botnet threat (e.g., determine a type of botnet threat) and/or to verify whether to associate an action to block the IP address causing the botnet attack.

The computing device(s) 110 can receive a variety of input data 124 usable to determine output data 126 which may represent or otherwise be used to determine the action(s) 116. For instance, the computing device(s) 110 can receive, as the input data, malicious data from the decoy device 128 associated with the "honeypot" network. The input data 124 can indicate malicious activity associated with a data file and can include, for example, an IP address that sent or originated the botnet attack, a hash of the data file having the malicious data, a type of malicious activity, a time the malicious data was created or received by a particular decoy device (e.g., a time a malicious file was received), or other malicious information. Additional detail of the computing device(s) 110 processing the input data 124 and generating an action can be found throughout this disclosure including in FIGS. 2 and 3 below.

In various examples, the computing device(s) 110 can implement a model or component to aggregate the input data 124 from one or more of: a service of the services 108, the client device 104, a storage device, or other entity of the service provider network 102. The computing device(s) 110 can identify a hash of a malicious file stored by the decoy device 128, and determine presence of a similar hash stored by another IP address and/or included in a message being transmitted. For example, the computing device(s) 110 can detect presence of the hash in the service provider network 102 and determine that the entities hosting or transmitting the hash value also include malicious data associated with the botnet attack. In this way, the computing device(s) 110 can analyze other IP addresses or devices that have unknowingly exchanged the malicious data.

In various examples, the data 120, the input data 124, and/or the output data 126 may be associated with and/or be transmitted in geographical region or a content delivery network. For example, the input data 124 can be associated with one or more geographical regions, content delivery networks, and the like, and an action can be determined for a portion of the geographical region or the content delivery network to isolate the malicious data to the respective portion.

To detect or otherwise receive malicious data the computing device(s) 110 may employ a streaming analytics service that is configured to detect a threat actor accessing a storage device, a computing device, a network, a user account, a service, etc. associated with a device or service of the service provider network 102. For example, the threat determination component 112 can aggregate, query, sample, or otherwise receive data representing IP activity, network data, service data, port data, etc. associated with the service provider network 102. In various examples, the computing device(s) 110 can track activity of the IP addresses over the service provider network 102 to ensure that data exchanged in association with such IP addresses are free of malicious data. The computing device can, for example, analyze the network data associated with various IP addresses over time, such as domain names associated with the IP address, how often the IP address accesses a resource, a number of user accounts associated with the IP address, types of resources accessed, and the like.

In various examples, the threat determination component 112 can receive the input data 124 indicative of one or more different types of botnet attacks and determine whether to change a setting, parameter, or the like associated with the IP address of the threat actor and/or of a device controlled by the threat actor to prevent further transmission of the botnet attack(s). In some examples, the techniques can include the computing device(s) 110 causing an action to reduce or eliminate an amount of data that a particular IP address can transmit within the service provider network 102 at a future time. For example, an output by the threat determination component 112 can cause a "null-routing" (or similar) for all outgoing packets to the IP address thereby causing the IP address to stop forwarding malicious data at a border, or perimeter, or the service provider network 102.

In some examples, the computing device 110 can determine a type of malicious event such as a type of botnet attack including detecting when and which multiple devices act collectively to conduct the botnet attack. For example, the threat determination component 112 can determine an instance type associated with the IP address. Instance types can comprise varying combinations of resources such as processor, memory, storage, and/or networking capacity. For example, a first instance type can include a first combination of resources having a first size and a second instance type can include a second combination of resources having a second size. In example, the instance type can be used as criteria for determining the action 116.

In various examples, the threat determination component 112 can determine one or more domain names associated with the botnet attack (e.g., a number of second-level domain names using a particular IP address) over a time period. For example, the threat determination component 112 can query one or more domain resolution records to identify one or more IP addresses, one or more domains associated with the IP addresses, a computing device(s) etc. that accessed the IP address hosting the botnet attack. In some examples, the other IP address(es), the domain(s), the computing device(s), etc. may not be associated with an account of the service provider network 102 and instead represent a third-party device. By querying the domain resolution records, the threat determination component 112 can determine a number of IP addresses, a number of domain names, and/or specific second-level domain names that are associated with the IP address hosting the botnet attack over the time period. For instance, the threat determination component 112 can determine a first value indicating that at least one second-level domain name associated with the hosting IP address is included in a hierarchal list of second-level domain names, or a second value indicating that the second-level domain name associated with the hosting IP address is not included in, or absent from, the hierarchal list of second-level domain names.

In some examples, the threat determination component 112 can determine whether to perform one of: a) a first action to block the hosting IP address (or another IP address) from exchanging second data at a future time based on the type of malicious activity in the first data, the first value, and/or the number of second-level domain names associated with the first data meeting or exceeding a second-level domain name threshold, or b) a second action to refrain from blocking the hosting IP address (or the other IP address) from exchanging the second data over the second time period based on the type of malicious activity in the first data, the second value, and/or the number of second-level domain names associated with the first data being below the second-level domain name threshold.

The threat determination component 112 can output a value to represent different levels of risk to the operation of the service provider network 102 based on the number of domains and/or the type of domains potentially impacted by the malicious event and/or an action to mitigate the malicious event. For example, some IP addresses may be associated with critical services or infrastructure that if unable to exchange data (e.g., blocked) could cause a greater disruption to devices accessing the IP address via the service provider network 102 (versus the disruption caused by the botnet attack). A relatively higher risk level may be associated with an IP address hosting second-level domain names of a particular type and/or above a domain name threshold, for example, than another IP address hosting fewer, different, or no second-level domain names.

The computing device 110 can, for example, monitor data exchanged over the service provider network 102 continuously, and aggregate data from one or more sources at different times as the input data 124. Additionally, or alternatively, the computing device 110 can determine which time periods, sources, geographical regions, etc. to collect data for analysis to detect different types of attacks. In some instances, the threat determination component 112 may access a database (not shown) that stores data representing network activity for different time periods associated with one or more sources.

The model(s) 114 can represent a machine learned model, a statistical model, heuristic model, or a combination thereof and may be used to perform various functionality by the computing device(s) 110. In some examples, a model can be used to determine a threshold and/or an action, just to name a few. For example, a model of the model(s) 114 can be configured to evaluate malicious activity of various IP addresses over time for use in determining a setting of a network (e.g., a configuration of a server or other network element) that protects the service provider network 102, the device 104, the computing device(s) 110, etc. from the botnet attack.

In some examples, a model can automatically modify a network setting to remedy the malicious event(s) based on the output data 126. For example, the action(s) 116 can include modifying a setting of a network element of the service provider network 102 to mitigate an impact of the malicious event(s) on the service provider network 102 or a device or entity associated therewith such as a potential impact to the client device(s) 104, and so on. The action(s) 116 can include, for example, an action to block an IP address from exchanging data for a period of time (e.g., one hour), and to check after the time period to determine whether the malicious data is present.

The model can, in some examples, determine presence of a network element operated by or otherwise associated with the service provider network (e.g., a server, computing device, network entity, etc. that is configured between the IP address and a computing device). The model can, for example, modify a setting of the network element to prevent the IP address from transmitting the malicious activity.

In some examples, the action(s) 116 can be based at least in part on whether the input data 124 is received from one of the services 108, a geographic region, a data center, a third-party device, and so on. The analysis component 206 can, for instance, determine whether the IP address hosting the malicious data (e.g., malware, etc.) or device is associated with an account provided by the service provider, and output an indication to block data for the IP address based on whether or not the IP address is associated with an account with the service provider.

Though FIG. 1 shows the threat determination component 112 and the model(s) 114 separately for discussion purposes, functionality associated with the threat determination component 112 or the model(s) 114 can be included in the threat determination component 112, the model(s) 114, or another component or device of the service provider network 102.

Figure 2:
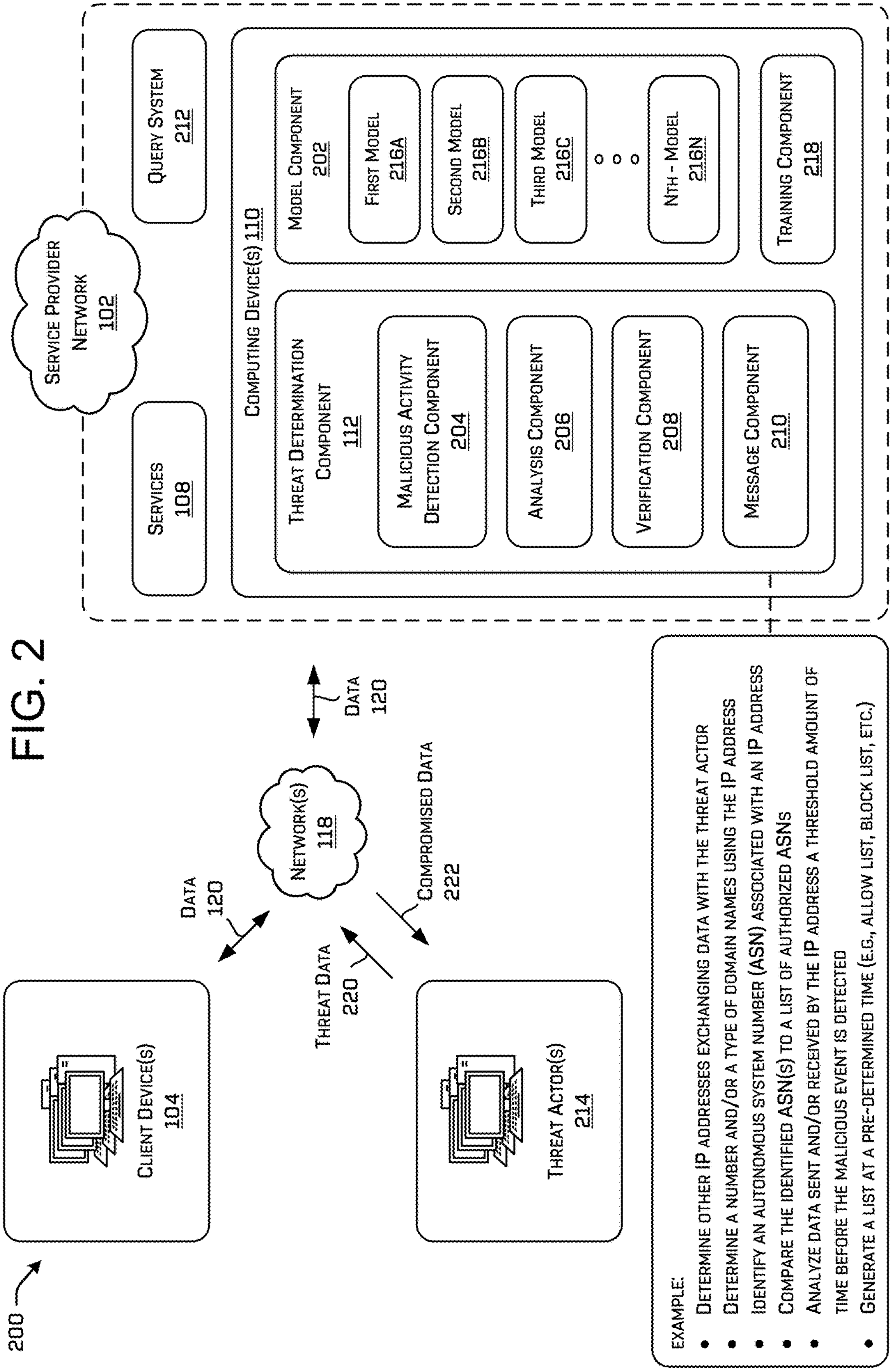
FIG. 2 illustrates a diagram of an example service provider network implementing example components to perform the techniques described herein.

FIG. 2 illustrates a diagram 200 of an example service provider network implementing example components to perform the techniques described herein. For example, the service provider network 102 can implement the computing device(s) 110 and the threat determination component 112 of FIG. 1. As shown in FIG. 2, the computing device(s) 110 comprises a model component 202, the threat determination component 112 which further comprises malicious activity detection component 204, an analysis component 206, a verification component 208, and a message component 210. The service provider network 102 further includes a query system 212.

The diagram 200 further depicts the data 120 (e.g., data associated with a service of the service 108, data associated with a client device, a replication of a data stream, user profile data, etc.) being exchangeable between the service provider network 102, the client device(s) 104, and a threat actor 214 initiating a malicious attack by exchanging threat data 220 over the network(s) 118. The threat actor 214 can attempt to act as an IP address of a computing device, such as the client device(s) 104 by including the threat data 220 into the service provider network 102. The threat data 220 can represent a variety of different attack types and, depending on examples, can include requests to access data associated with personal information, a user account, financial information, and the like. Using the techniques described herein enables analysis of network activity of various decoy devices, client devices, or the like to identify malicious activity related to port scanning, brute-force, credential stuffing, password guessing, vulnerability exploitation, malware download, and the like.

In some examples, the threat actor(s) 214 can receive compromised data 222 representing data gathered from one or more devices infected by the threat data 220 (e.g., results of malware, a botnet attack, etc.). Using the techniques described herein, compromised data 222 can be reduced or eliminated including sending compromised data 222 from one or more of the decoy devices 128 to the threat actor(s) 214 to cause the threat actor(s) 214 to continue to share data with the decoy device(s) 128 usable to determine a defense strategy for protecting the service provider network 102.

In some examples, the threat determination component 112 and/or the model component 202 (or models thereof) can receive the input data 124 for processing, and generate the output data 126. The threat determination component 112 can, in some examples, provide output data usable to determine actions to mitigate malicious activity over the service provider network 102 and/or the network(s) 118. For example, the threat determination component 112 can monitor and protect one or more of: the services 108, the client device(s) 104, third-party devices, a third-party network, and so on. By way of example and not limitation, the threat determination component 112 can receive the input data 124 representing malicious data and generate an action (e.g., the action 116) that minimizes an impact to operation of the service provider network 102 collectively.

In various examples, the threat determination component 112 and/or the model component 202 can monitor various IP addresses over time. For example, new input data can be received and processed over time to dynamically determine actions (e.g., to ensure that IP addresses free of malicious activity are not blocked). For example, the threat determination component 112 and/or the model component 202 can determine a first action (e.g., to block) an IP address at a first time and/or determine at second action at a second time after the first time to maintain the block of the IP address or to unblock the IP address, depending upon current indictors of malicious activity associated with the IP address.

As shown in FIG. 2, the model component 202 includes one or more models, such as a first model 216A, a second model 216B, a third model 216C up to an Nth model 216N (collectively "models 216"), where N can be any integer greater than 1. The models 216 may be stored on, or otherwise accessible by, memory associated with the computing device(s) 110. The models 216 may represent machine learned models, statistical models, heuristic models, or a combination thereof, and may be implemented in association with a component of the computing device(s) 110. In various examples, the model component 202 can include at least the functionality associated with the model(s) 114.

The malicious activity detection component 204 can represent functionality to sample, receive, collect, detect, or otherwise determine data for processing by the computing device(s) 110. In some examples, the malicious activity detection component 204 can sample or receive data from a honeypot network (or similar decoy system) automatically as malicious activity is detected. In some examples, malicious data for analysis can be received based on an input from a user (e.g., an administrator of the service provider).

Generally, the analysis component 206 can represent functionality to analyze data associated with the service provider network 102 such as the sampled or received data from the malicious activity detection component 204. The analysis component 206 can represent functionality to generate the output data 126 including, for example, determining a type of malicious activity, a number of IP addresses impacted by the threat data 220, a number of computing devices impacted by threat data 220, and/or domains associated with an IP address, just to name a few.

In some examples, the analysis component 206 can determine which other computing devices or IP addresses exchanged data with the candidate IP address received as input data. For example, the analysis component 206 can access a variety of different data as input data including log data, stored data, or a record of network activity to identify other IP addresses that received data that potentially included a malicious attack. By analyzing the data or a record, the analysis component 206 can determine which computing devices, domain names (e.g., second-level domain names), etc. received data from the IP address hosting the threat data 220. In some examples, the analysis component 206 can determine a type of service, product, etc. associated with the respective computing devices, domain names, etc. accessing the malicious activity associated with the IP address (e.g., to block an IP address shared by multiples websites.

In some examples, the analysis component 206 can analyze the input data 124 to identify an autonomous system number (ASN) associated with the IP addresses hosting the threat data 220 and/or an ASN for each of the IP addresses that accessed data from the hosting IP address (e.g., by accessing ASN information from a database). The analysis component 206 can compare the identified ASN(s) to a predetermined list of ASNs that are associated with IP addresses to block or to not block, and output a value or classification indicating whether the list includes the ASN (e.g., "yes" or "no" classification). The list of ASNs (e.g., ASN allowlist, ASN blocklist) can include ASNs of cloud hosting providers which are most commonly abused for malware hosting, and can be updated periodically over time. In this way, ASN information can be used to identify a particular action for the hosting IP address.

In some examples, the analysis component 206 can analyze data sent and/or received by the IP address a threshold amount of time before the malicious data (e.g., the threat data 220) is detected. For instance, the analysis component 206 can determine a number of computing devices (e.g., within a service provider network), instances, etc. that accessed the hosting IP address one hour (or other time period) prior to the malicious data resulting in the infection (e.g., based on accessing network log data stored in a database associated with the service provider). If more than a threshold number of computing devices, instances, etc. that connected to the IP address (e.g., more than 5000 instances) in the threshold time, the analysis component 206 can output an indication to "not block" the particular computing device. In this way, the analysis component 206 can preemptively access reports to detect others potentially hosting IP addresses, and consider network activity associated with such computing devices when determining an action to mitigate the malicious activity.

In some examples, the analysis component 206 can generate a list (e.g., allow list, block list, etc.) of domain names, ASNs, IP addresses, etc. that are allowed to be blocked or not allowed to be blocked based on various criteria. For example, an IP address may be precluded from being blocked based on whether one or more second-level domain names are associated with the IP address. In some examples, the analysis component 206 can access a list of the top N (where N is an integer) domain names that are accessed by one or more computing devices, and the analysis component 206 can verify whether or not the domain name(s) associated with the IP address hosting the malicious activity is included on the list, and cause an appropriate action. For example, the analysis component 206 can determine how many computing devices accessed certain domains from a list of domains to not block.

The verification component 208 can represent functionality to verify whether it is "safe" to block a particular IP address. For example, for each IP address associated with the threat data 220 or other malicious activity, the verification component 208 can verify whether or not to block the IP address based on determinations from the analysis component 206. In some examples, the verification component 208 can output a value to cause a blocking action for the IP address based on the number of computing devices that accessed domain names from a list of domain names. For instance, the verification component 208 can verify that an IP address to be blocked is associated with a domain name in a domain name list and may include not blocking the IP address to minimize disruption to devices associated with customers accessing certain domains (e.g., a website, service, etc.). Additionally, or alternatively, the verification component 208 can output a non-blocking action for the IP address in examples when the number of instances accessed is equal to or greater than the threshold number of instances connected to the IP address.

In some examples, the verification component 208 can output a blocking action based on the IP address being associated with, or accessed by, a second-level domain (or threshold number of second-level domains). For example, based on the analysis component 206 determining that the IP address was accessed by a particular domain name, the verification component 208 can compare one or more domain names to a record or file indicating domain names to avoid blocking for a variety of reasons. In some examples, domain names can be ranked in a ranked domain name list to represent a hierarchy of domain names for blocking or not blocking.

The message component 210 can represent functionality to generate, configure, or exchange a message between the computing device(s) 110 and another device such as the client device(s) 104. For example, the message component 210 can configure a message for sending to the client device(s) 104 (or other devices) based on the analysis component 206 determining the presence of the threat data 220 (e.g., a botnet attack). The message component 210 can also or instead configure a message for sending to a device impacted by the threat data 220 to indicate that the IP address hosting the threat data 220 is being blocked (e.g., a first action) or not being blocked (e.g., a second action).

In various examples, the service provider network 102 can implement a query system 212 to initiate, execute, and compile results for various queries. The computing device(s)

110 can implement the query system 212 to provide detail relative to a botnet attack, or other malicious activity. For instance, the query system 212 can be used to gather more detailed information from one or more entities for processing by the verification component 208 (or another component). In some examples, the query system 212 can target pre-determined network information that may be useful for understanding context of the botnet attack (e.g., a resource targeted by the IP address, etc.). The query system 212 can, in some examples, collect information associated with the malicious data, and configure the query results used in determining the output data 126. In some examples, the query system 212 can represent an interface for gathering information from one or more sources and may be employed to collect data for a threshold amount of time before or after the botnet attack (e.g., to identify other IP addresses that sent or received the botnet attack, to validate the malicious event, identify a strategy for defending against the potential malicious event, etc.).

The computing device(s) 110 can include a training component 218 to provide functionality to train a machine learning model to improve predictions associated with one or more of the techniques discussed herein. In some examples, the training component 218 can include training data that has been generated by one or more machine learned models or components described herein. For example, the training component 218 can receive user information and network information associated with the output data 126 for use as training data (e.g., a threshold value, an example rate for accessing a particular resource, and the like). Third-party labeled training data can also or instead be used for training in various examples.

In some examples, the computing device(s) 110 can implement the training component 218 to improve detection and classification of malicious data impacting operation of a network or device. In some examples, ground truth network behaviors may be determined over time based on determinations to block or not block various IP addresses (either hand labelled or determined by another machine learned model) and such ground truth blocking information may be used to determine whether or not to block future IP addresses by a same or similar threat actor.

Figure 5:
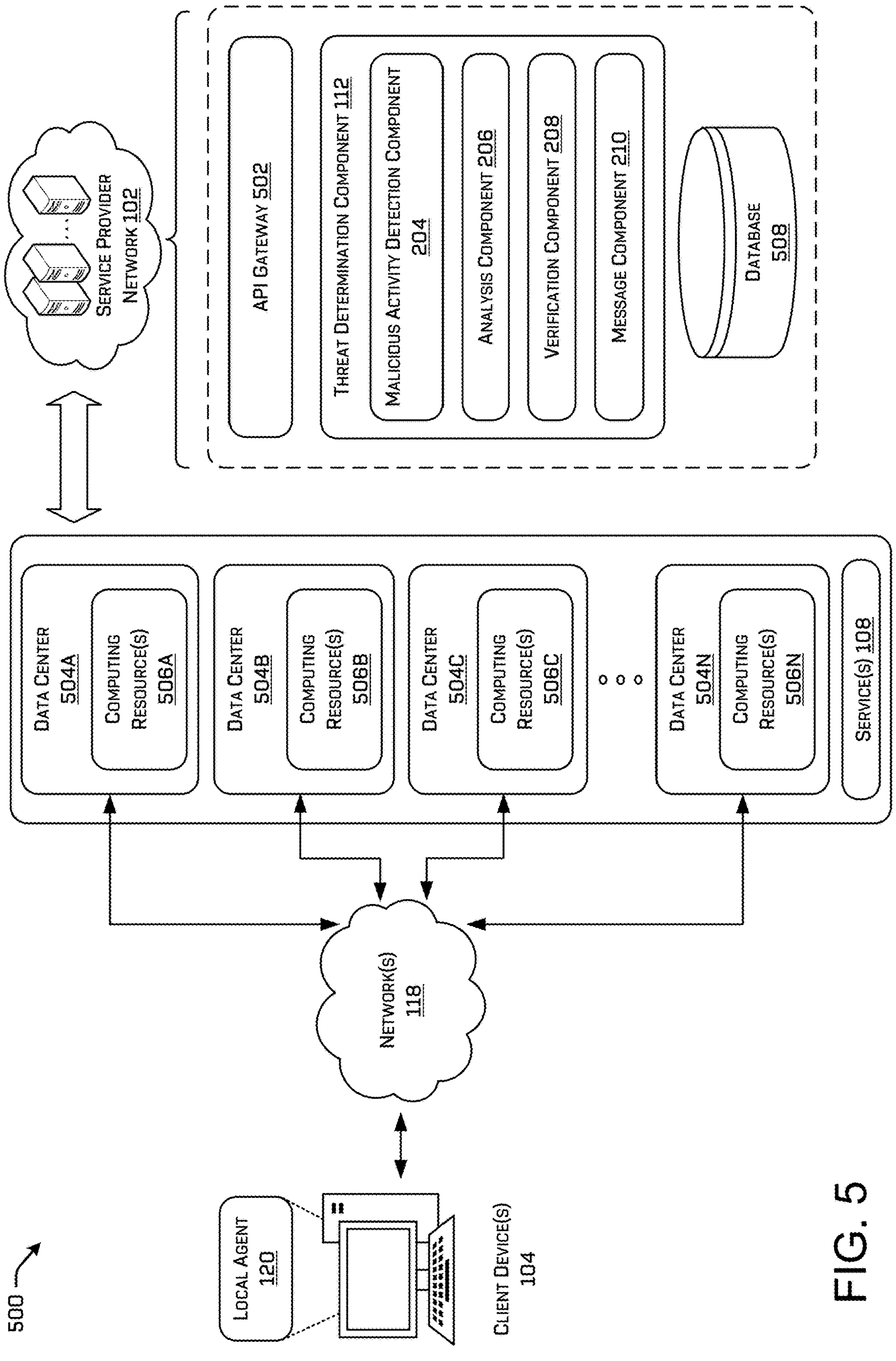
FIG. 5 illustrates a system and network diagram of an example operating environment that includes a service provider network for implementing the techniques described herein.

In various examples, one or more components (e.g., the verification component 208, etc.) can include or access a database (e.g., the database 508 of FIG. 5 or a database local to the computing device(s) 110), a container registry, a memory, or other storage device to store network data, user data, and other data usable for implementing the techniques discussed herein. Some stored data can be used as input data (or training data) into a model as described herein.

Though depicted in FIG. 2 as separate components of the threat determination component 112, the functionality associated with the malicious activity detection component 204, the analysis component 206, the verification component 208, the message component 210, and/or the query system 212 can be included in a different component of the service provider network 102 or the computing device(s) 110. In some instances, the components described herein may comprise a pluggable component, such as a virtual machine, a container, a serverless function, etc., that is capable of being implemented in any service provider network and/or in conjunction with any API gateway.

Figure 3:
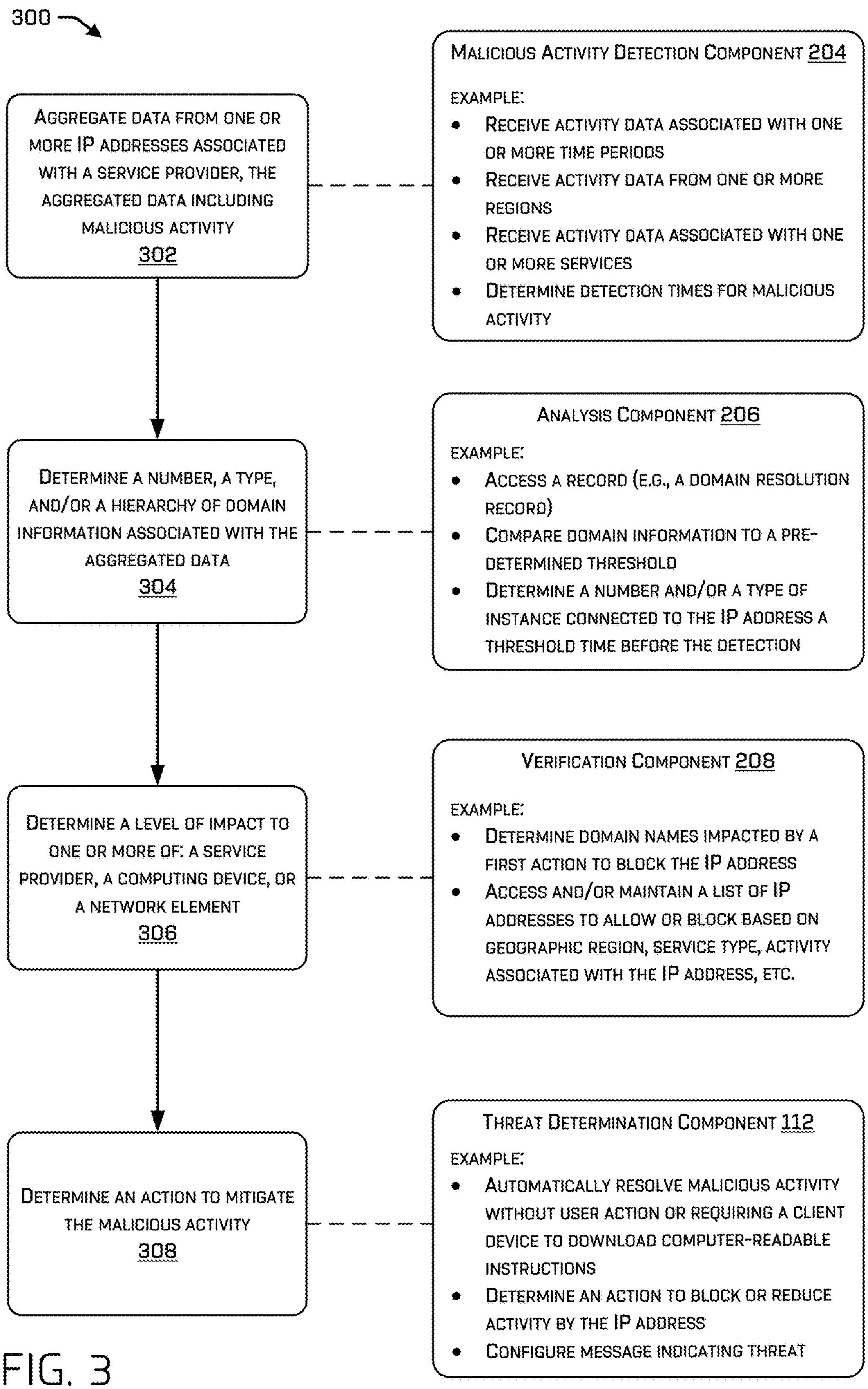
FIG. 3 is a pictorial diagram illustrating an example process by an example computing device to determine an action to mitigate malicious activity associated with an IP address as described herein.

FIG. 3 is a pictorial diagram illustrating an example process 300 by an example computing device to determine an action to mitigate malicious activity associated with an IP address as described herein. The example process 300 may be implemented by a computing device such as the computing device(s) 110 of FIG. 1.

An operation 302 can include aggregating data from one or more IP addresses associated with a service provider, the aggregated data including malicious activity. For example, the malicious activity detection component 204 can receive data from one of: a decoy device associated with a honeypot network, a service, a client device, a data center, or a network associated with the service provider network 102, just to name a few. In some examples, the malicious activity detection component 204 can receive first activity data associated with a first IP address in a first geographic region and second activity data associated with a second IP address in a second geographic region. In some examples, the malicious activity detection component 204 can aggregate the data from a network (e.g., a honeypot network), content delivery network, or other entity associated with the service provider network 102. The aggregated data can represent malicious activity data associated with one or more time periods, malicious activity data from one or more geographical regions, malicious activity data associated with one or more services (e.g., one or more of the services 108), and the like. In various examples, the aggregated data can include detection times for various malicious events.

An operation 304 can include determining a number, a type, and/or a hierarchy of domain information associated with the aggregated data. For example, the operation 304 can include the analysis component 206 accessing a record, a report, a list, or other stored data indicating domain names, domain types, a domain location, and/or other domain information. For example, the analysis component 206 can access a domain resolution record to identify domains resolved from an IP address over time. The analysis component 206 can identify a number of domain names associated with the IP address hosting the malicious activity, a type of domain name (e.g., a service provided by the domain name, etc.), or a ranked list of domain names (e.g., a first-level domain, second-level domain, etc.). In some examples, the accessed data can represent activity by the IP address prior to a time that the malicious activity is detected.

In various examples, the operation 304 can include comparing the domain information (e.g., a number of domain names, etc.) to a predetermined threshold. For instance, the analysis component 206 can compare the number of domain names associated with the IP address(es) to a threshold number (e.g., the number of second-level domain names resolved from the IP address over a time period can be compared to an activity level threshold representing a level of activity by the second-level domain names).

An operation 306 can include determining a level of impact to one or more of: a service provider, a computing device, or a network element. For instance, the operation 304 can include the verification component 208 determining a value representing a predicted level of impact to the operation of computing devices using or otherwise in the service provider network which may or may not include computing devices receiving a service from the service provider network (e.g., have an account). The verification component 208 can, for example, determine how many and which types of computing devices would be affected by blocking the IP address hosting the malicious activity. In some examples, the operation 306 can include the verification component 208 accessing and/or maintaining stored data representing a list of IP addresses to allow or block. In some examples, the stored data can represent an allow list or a block list that is generated at least in part based on a geographic region, service type, network activity, etc. associated with the IP address. In other words, different geographic regions, service types, etc. can be associated with different thresholds to manage an action for an IP address with consideration to the context of the IP address.

An operation 308 can include determining an action to mitigate the malicious activity. For example, the operation 308 can include the threat determination component 112 generating data indicating an action for the IP address such as first action to block the IP address or a second action to refrain from blocking the IP address. In some examples, the threat determination component 112 can determine the action based on output data from the analysis component 206 and/or the verification component 208. In various examples, the action can be determined automatically to resolve the malicious activity without user action and without requiring a computing device to download computer-readable instructions. A first action can, for example, be output by the threat determination component 112 based on the number of domain names meeting or exceeding the threshold number of domain names for a given time period (e.g., to not block the IP address). Alternatively, a second action can be output based on the number of domain names being less than the threshold number (e.g., modify a setting or parameter of a network element to block the IP address). A network element can represent, for example, an entity that facilitates an exchange of data between two IP addresses. Thus, the network element can include a server, a computing device, or the like that recognizes the blocked IP address and refrains from transferring data associated with the blocked IP address.

In some examples, the computing device(s) 110 can employ the message component 210 to configure and send a message to an IP address (that may not be aware that it is hosting the malicious activity) to enable the computing device and/or user of the IP address to implement a solution that mitigates a potential impact of the malicious activity. In this way, various IP addresses unknowingly hosting the malicious activity can receive a message to ensure that a security solution is implemented that reduces or eliminates operational impacts caused by malicious activity on the various IP addresses.

Figure 4:
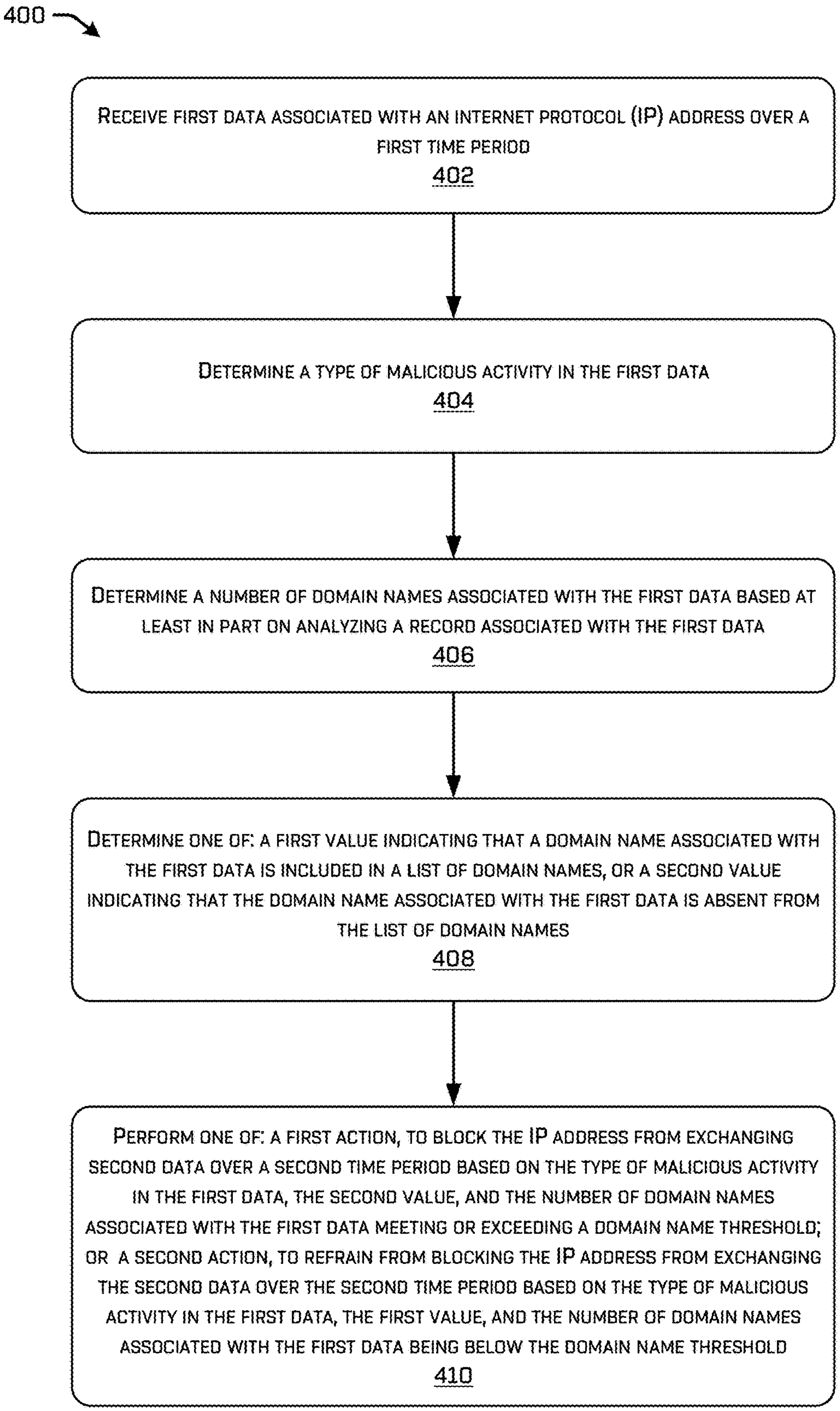
FIG. 4 is a flow diagram of an example method for performing an action to mitigate malicious activity associated with an internet protocol address.

FIG. 4 is a flow diagram of an example method 400 for performing an action to mitigate malicious activity associated with an internet protocol address. For example, the service provider network 102 can identify activity by an IP address that is indicative of a malicious event. The service provider network 102 can implement the threat determination component 112 and/or the model component 202 to detect, label, and/or mitigate the malicious event.

At 402, the threat determination component 112 associated with the service provider network 102 may receive first data representing first activity associated with an internet protocol (IP) address over a first time period. For instance, the threat determination component 112 can receive the input data 124 representing activity by an IP address associated with a decoy device, a client device, a port, or the like. In some examples, the threat determination component 112 can sample or otherwise receive the first data representing activity associated with one or more of the services 108. The first data can represent, for instance, activity (a read request, a write request, a request to view data, etc.) associated with an IP address of a decoy device in a honeypot network and/or by an IP address of a threat actor behaving as the client device.

At 404, the threat determination component 112 associated with the service provider network 102 may determine a type of malicious activity in the first data. In some examples, the type of malicious activity can correspond to a type of botnet attack (e.g., denial of service, crypto mining, data theft, and so on). In some examples, the threat determination component 112 can detect a type of malware associated with the input data 124.

At 406, the threat determination component 112 associated with the service provider network 102 may determine a number of domain names associated with the first data based at least in part on analyzing a record associated with the first data. For example, the threat determination component 112 can access a file or other stored data from a storage device, database, etc., and determine the number of domain names (or devices associated with therewith) resolved from the IP address over a time period. In some examples, the threat determination component 112 can retrieve a list of IP addresses, computing devices, domain names, etc. to remain in service as an action to mitigate the malicious activity.

At 408, the threat determination component 112 associated with the service provider network 102 may determine one of: a first value indicating that a domain name associated with the first data is included in a list of domain names, or a second value indicating that the domain name associated with the first data is absent from the list of domain names. For example, the threat determination component 112 can implement the analysis component 206 to compare the domain names associated with the input data to the list of domain names, and output the first value or the second value based on whether or not the domain name is included in the list of domain names.

At 410, the threat determination component 112 associated with the service provider network 102 may perform one of: a first action, to block the IP address from exchanging second data over a second time period based on the type of malicious activity in the first data, the second value, and the number of domain names associated with the first data meeting or exceeding a domain name threshold; or a second action, to refrain from blocking the IP address from exchanging the second data over the second time period based on the type of malicious activity in the first data, the first value, and the number of domain names associated with the first data being below the domain name threshold. For instance, the verification component 208 can output data indicating an action based on the type of malicious activity and/or a number of domain names associated with the malicious activity.

In some examples, the operation 410 can include the service provider network 102 performing an action to mitigate the malicious activity. For example, the threat determination component 112 can implement a strategy to defend against the malicious activity such as automatically modifying a setting of a network element, application, or service of the service provider network to reduce impact of the malicious activity. The action can also or instead include configuring a message for sending to one or more computing devices accessed by the IP address such that the message indicates a portion of the one or more computing devices to protect from the malicious activity represented in the first data.

The operation 410 can be performed, for example, independent of requiring a user or a client device to receive, transmit, or store computer-readable and/or human-readable instructions associated with the malicious activity. In other words, the techniques can be used in a cloud computing environment to automatically identify an action without receiving or accessing data from a client device (e.g., absent receiving monitored data).

FIGS. 3 and 4 illustrate flow diagrams of example methods or processes that illustrate aspects of the functions performed at least partly by the service provider network 102 as described in relation to FIG. 1 and elsewhere. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 as described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

In some examples, the techniques of process 300 and/or the method 400 may be performed by a system comprising one or more processors and one or more computer-readable media storing computer-executable instructions that, when executed by the one or more processors, cause the one or more processors to perform the operations of the methods.

FIG. 5 illustrates a system and network diagram 500 of an example operating environment that includes a service provider network (that may be part of or associated with a cloud-based service network/platform) for implementing the techniques described herein. The service provider network 102 can include an API gateway 502 that may receive an API call and route the API call to a component or service. In various examples, the service provider network 102 can include the threat determination component 112 which comprises the malicious activity detection component 204, the analysis component 206, the verification component 208, and the message component 210.

The service provider network 102 can provide computing resources (e.g., computational resource(s) 506A, computational resource(s) 506B, computational resource(s) 506C up to an Nth computational resource(s) 506N (collectively "computational resources 506", where N can be any integer greater than 1) like VM instances, containers, serverless functions, storage, etc., on a permanent or an as-needed basis. Among other types of functionalityies, the computing resources 506 provided by the service provider network 102 may be utilized to implement the various cloud-based services. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. As shown, the service provider network 102 can include a database 508 for use in association with the malicious behavior detection techniques discussed herein. The service provider network 102 can also be configured to provide other types of computing resources not mentioned specifically herein.

The computing resources 506 provided by the service provider network 102 may be enabled in one example by one or more data centers 504A-504N (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative example for a data center 504 that can be utilized to implement the technologies disclosed herein will be described below with regard to FIG. 7.

The data centers 504 may be configured in different arrangements depending on the service provider network 102. For example, one or more data centers 504 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The users and/or admins of the service provider network 102 may access the computing resources 506 provided by the data centers 504 of the service provider network 102 over any wired and/or wireless network(s) 118 (utilizing a client device(s) 104 and/or another accessing-user device), which can be a wide area communication network ("WAN"), such as the Internet, an intranet or an Internet service provider ("ISP") network or a combination of such networks. For example, and without limitation, a device operated by a user of the service provider network 102 may be utilized to access the service provider network 102 by way of the network(s) 118. In various examples, a local-area network ("LAN"), the Internet, or any other networking topology known in the art that connects the data centers 504 to remote clients and other users can be utilized. It should also be appreciated that combinations of such networks can also be utilized.

In a distributed computing environment, such as the one included in the service provider network 102 (e.g., computing-resource network), a fleet of VM instances and/or servers may have workflow or processes executed thereon to manage resources. For instance, a patch may need to be installed on each VM instance and/or resource at a particular time. In such distributed applications of workflows or processes, a load balancer may be at the front end in front of the fleet of servers where a request for a workflow comes in, and the load balancer distributes the request to execute the workflow amongst the servers.

Figure 6:
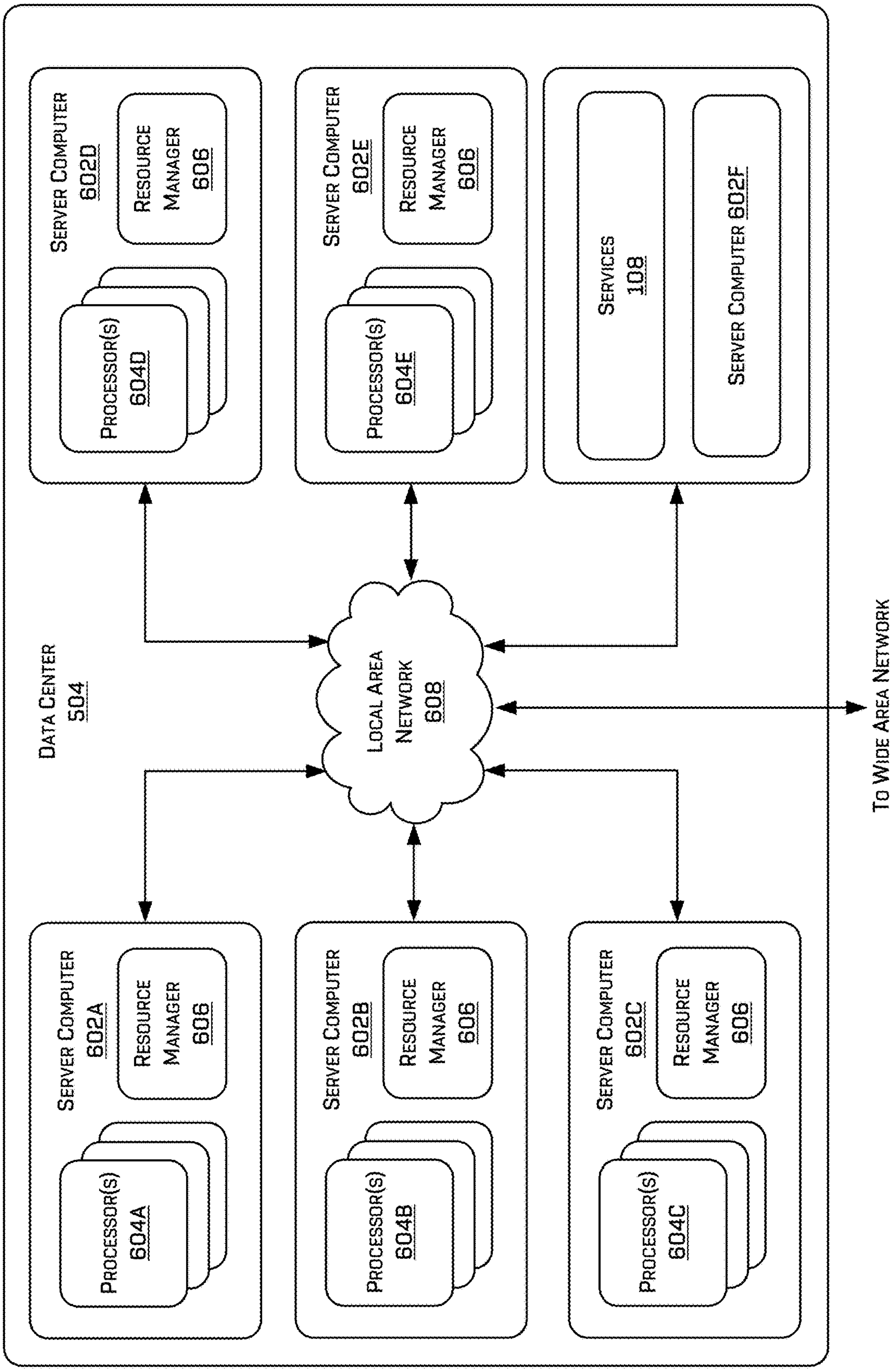
FIG. 6 is a diagram illustrating a configuration for an example data center that can be utilized to implement aspects of the techniques disclosed herein.

FIG. 6 is a diagram 600 illustrating a configuration for an example data center that can be utilized to implement aspects of the techniques disclosed herein. The example data center 504 shown in FIG. 5 includes several server computers 602A-602F (which might be referred to herein singularly as "a server computer 602" or in the plural as "the server computers 602") each having one or more processors 604A, 604B, 604C, 604D, and 604E. In some examples, the processor(s) 604 can represent a central processing unit (CPU), a graphics processing unit (GPU), a Tensor Processing Unit (TPU), an integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

The server computers 602 can be standard tower, rack-mount, or blade server computers configured appropriately for providing the computing resources described herein (illustrated in FIG. 6 as the processor(s) 604A-604E). As mentioned above, the computing resources provided by the service provider network 102 can be data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 504 can also be configured to provide network services and other types of services, some of which are described in detail below with regard to FIG. 6.

The data center 504 shown in FIG. 6 also includes a server computer 602F that can execute some or all of the software components described above. For example, and without limitation, the server computer 602F can be configured to execute components of the service provider network 102, including the services 108.

In the example data center 504 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504N, between each of the server computers 602A-602F in each data center 504, and, potentially, between computing resources in each of the server computers 602. It should be appreciated that the configuration of the data center 504 described with reference to FIG. 6 is merely illustrative and that other implementations can be utilized.

Figure 7:
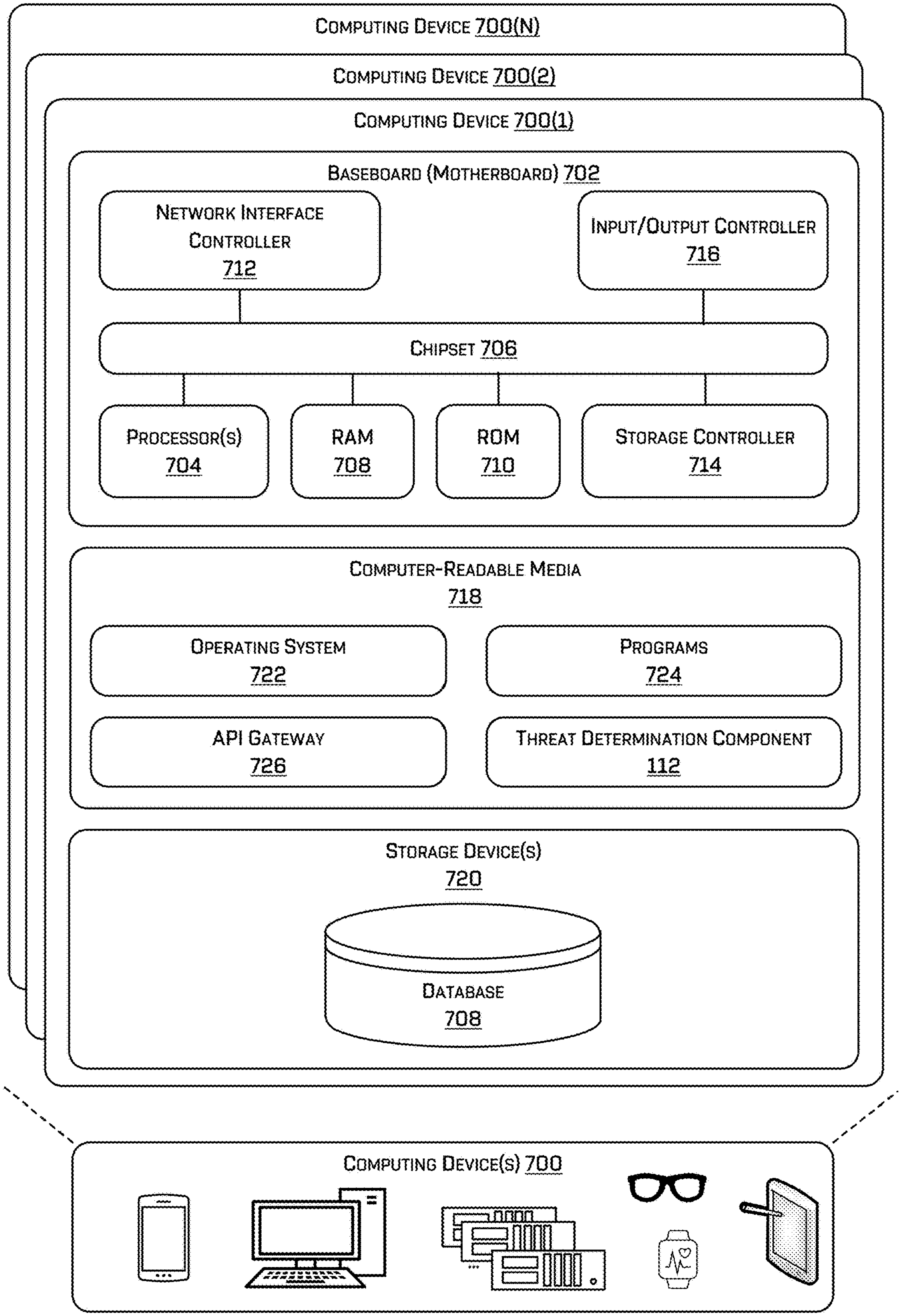
FIG. 7 is a computer architecture diagram showing an illustrative computer hardware architecture for implementing one or more computing devices to perform the techniques disclosed herein.

FIG. 7 is a computer architecture diagram showing an illustrative computer hardware architecture for implementing one or more computing devices 700 to perform the techniques disclosed herein. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computing device 700 includes a baseboard 702, or "motherboard," which is a printed circuit board to which a multitude of components or devices can be connected by way of a system bus or other electrical communication paths. In one illustrative configuration, one or more processor(s) 704 (e.g., CPU, GPU, TPU, and the like) operate in conjunction with a chipset 706. The processor(s) 704 can be standard programmable processors that perform arithmetic and logical operations necessary for the operation of the computing device 700.

The processor(s) 704 perform operations by transitioning from one discrete, physical state to the next through the manipulation of switching elements that differentiate between and change these states. Switching elements generally includes electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the processor(s) 704 and the remainder of the components and devices on the baseboard 702. The chipset 706 can provide an interface to a RAM 708, used as the main memory in the computing device 700. The chipset 706 can further provide an interface to a computer-readable storage medium such as a read-only memory ("ROM") 710 or non-volatile RAM ("NVRAM") for storing basic routines that help to startup the computing device 700 and to transfer information between the various components and devices. The ROM 710 or NVRAM can also store other software components necessary for the operation of the computing device 700 in accordance with the configurations described herein.

The computing device 700 can operate in a networked environment using logical connections to remote computing devices and computer systems through a network, such as the network(s) 118. The chipset 706 can include functionality for providing network connectivity through a network interface controller (NIC 712), such as a gigabit Ethernet adapter. The NIC 712 is capable of connecting the computing devices 700 over the network(s) 118. It should be appreciated that multiple NICs 712 can be present in the computing device 700, connecting the computer to other types of networks and remote computer systems.

The computing device 700 can be connected to one or more computer-readable storage media 718 storing software components for the computer device 700, and one or more mass storage devices 720 for storing data. The computer-readable storage media 718 can store an operating system 722, programs 724, an API gateway 726, and the threat determination component 112, which have been described in greater detail herein. The mass storage device 720 can be connected to the computing device 700 through a storage controller 714 connected to the chipset 706. The mass storage device 720 can consist of one or more physical storage units. The storage controller 714 can interface with the physical storage units through a Small Computer System Interface ("SCSI"), a serial attached SCSI ("SAS") interface, a serial advanced technology attachment ("SATA") interface, a fiber channel ("FC") interface, or other type of interface for physically connecting and transferring data between computers and physical storage units.

Generally, the computer-readable storage media 718 may store the components described herein as executable, computer-readable instructions. For instance, the components may include the API gateway 726, the model component 202, the threat determination component 112, or components associated with the threat determination component 112. The components may be stored and/or executed on a single server, or on a system of two or more computing devices 700.

The computing device 700 can store data on the mass storage device 720 by transforming the physical state of the physical storage units to reflect the information being stored. The specific transformation of physical state can depend on various factors, in different examples of this description. Examples of such factors can include, but are not limited to, the technology used to implement the physical storage units, whether the mass storage device 720 is characterized as primary or secondary storage, and the like.

For example, the computing device 700 can store information to the mass storage device 720 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 can further read information from the mass storage device 720 by detecting the physical states or characteristics of one or more particular locations within the physical storage units.

In addition to the mass storage device 720 described above, the computing device 700 can have access to the computer-readable storage media 718 to store and retrieve information, such as program modules, event structures, or other data. It should be appreciated by those skilled in the art that computer-readable storage media is any available media that provides for the non-transitory storage of data and that can be accessed by the computing device 700. In some examples, the operations performed by the service provider network 102, and/or any components included therein, may be supported by one or more devices similar to computing device 700. Stated otherwise, some or all of the operations performed by the service provider network 102, and/or any components included therein, may be performed by one or more computer devices 700 operating in a cloud-based arrangement. As shown, the mass storage device 720 may store the database 508 that includes information about meeting data, sensor data, user profiles, and services as well as rules and access policies.

By way of example, and not limitation, computer-readable storage media 718 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disc ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 720 can store an operating system 722 utilized to control the operation of the computing device 700. According to one example, the operating system comprises the LINUX operating system. According to another example, the operating system comprises the WINDOWS® SERVER operating system from MICROSOFT Corporation of Redmond, Washington. According to further examples, the operating system can comprise the UNIX operating system or one of its variants. It should be appreciated that other operating systems can also be utilized. The mass storage device 720 can store other systems or application programs and data utilized by the computing device 700.

In one example, the mass storage device 720 or other computer-readable storage media 718 is encoded with computer-executable instructions which, when loaded into the computing device 700, transform the computer from a general-purpose computing system into a special-purpose computer capable of implementing the examples described herein. These computer-executable instructions transform the computing device 700 by specifying how the processor(s) 704 transition between states, as described above. According to one example, the computing device 700 has access to computer-readable storage media storing computer-executable instructions which, when executed by the computing device 700, perform the various processes described above with regard to FIGS. 1-7. The computing device 700 can also include computer-readable storage media having instructions stored thereupon for performing any of the other computer-implemented operations described herein.

The computing device 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 700 might not include all of the components shown in FIG. 7, can include other components that are not explicitly shown in FIG. 7, or might utilize an architecture completely different than that shown in FIG. 7.

In various examples, the service provider network may be part of or associated with a cloud-based service network that can be configured to implement aspects of the functionality described herein.

The service provider network 102 can provide computing resources, like physical servers, VM instances, containers, serverless functions, network functions, and storage, on a permanent or an as-needed basis. Among other types of functionalities, the computing resources provided by the service provider network 102 may be utilized to implement the various services described above. The computing resources provided by the service provider network 102 can include various types of computing resources, such as data processing resources like VM instances, data storage resources, networking resources, data communication resources, application-container/hosting services, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 504 (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely (e.g., one of operation 406 or 408 may be performed). Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

What is claimed is:

1. A system comprising:

one or more processors; and one or more non-transitory computer-readable media storing instructions executable by the one or more processors, wherein the instructions, when executed, cause the one or more processors to perform operations comprising:

receiving first data associated with an internet protocol (IP) address over a first time period, the first data including malicious activity associated with at least one other IP address;

determining a type of the malicious activity in the first data;

querying, based on receiving the first data, domain resolution records to identify one or more second-level domain names that are associated with the IP address over the first time period;

determining a number of second-level domain names associated with the first data;

determining one of: a first value indicating that at least one second-level domain name associated with the first data is included in a ranked list of domain names, or a second value indicating that the at least one second-level domain name associated with the first data is absent from the ranked list of domain names;

performing one of:

a first action to block the IP address from exchanging second data over a second time period based on the type of malicious activity in the first data, the second value, and the number of second-level domain names associated with the first data being below a second-level domain name threshold; or a second action to refrain from blocking the IP address from exchanging the second data over the second time period based on the type of malicious activity in the first data, the first value, and the number of second-level domain names associated with the first data meeting or exceeding the second-level domain name threshold.

2. The system of claim 1, the operations further comprising:

generating the ranked list of domain names at a predetermined time, and determining the first value or the second value based on comparing the second-level domain names to the ranked list of domain names.

3. The system of claim 1, wherein the malicious activity represents a malicious file hosted by the IP address, and the operations further comprising:

determining an initial time at which a computing device received the malicious file from the IP address;

analyzing third data received a threshold period of time before the initial time at which the computing device received the malicious file; and performing the first action or the second action based on the analyzing.

4. The system of claim 1, the operations further comprising:

determining a network element associated with a service provider network that is configured between the IP address and a computing device; and modifying a setting of the network element to prevent the IP address from transmitting the malicious activity.

5. The system of claim 1, the operations further comprising:

identifying autonomous system number (ASN) data associated with the first data; and comparing the ASN data to a list of autonomous system numbers associated with a service or a network, wherein determining the first action or the second action is based on the comparing of the ASN data to the list of the autonomous system numbers.

6. A computer-implemented method comprising:

receiving first data associated with an internet protocol (IP) address over a first time period;

determining a type of malicious activity in the first data;

determining a number of domain names associated with the first data based at least in part on analyzing a record associated with the first data;

determining one of: a first value indicating that a domain name associated with the first data is included in a list of domain names, or a second value indicating that the domain name associated with the first data is absent from the list of domain names;

performing one of:

a first action, to block the IP address from exchanging second data over a second time period based on the type of malicious activity in the first data, the second value, and the number of domain names associated with the first data meeting or exceeding a domain name threshold; or a second action, to refrain from blocking the IP address from exchanging the second data over the second time period based on the type of malicious activity in the first data, the first value, and the number of domain names associated with the first data being below the domain name threshold.

7. The computer-implemented method of claim 6, wherein the domain name represents a second-level domain name, the record is a domain resolution record, and the computer-implemented method further comprising:

querying, based at least in part on receiving the first data, the domain resolution record to identify the domain name associated with the IP address over the first time period, wherein determining the number of domain names associated with the first data is based at least in part on the querying of the domain resolution record.

8. The computer-implemented method of claim 6, wherein the list is a ranked list of domain names, and the computer-implemented method further comprising:

generating the ranked list of domain names at a predetermined time, and determining the first value or the second value is based at least in part on comparing the domain names to the ranked list of domain names.

9. The computer-implemented method of claim 8, wherein the malicious activity represents a malicious file hosted by the IP address, and the computer-implemented method further comprising:

determining an initial time at which a computing device received the malicious file from the IP address;

analyzing third data received a threshold period of time before the time at which the computing device received the malicious file; and performing the first action or the second action based at least in part on the analyzing of the third data.

10. The computer-implemented method of claim 6, further comprising:

determining a level of impact to a computing device caused by the malicious activity; and determining the first action or the second action based at least in part on the level of impact to the computing device.

11. The computer-implemented method of claim 6, further comprising:

identifying autonomous system number (ASN) data associated with the first data; and comparing the ASN data to a list of autonomous system numbers associated with a service or a network, wherein determining the first action or the second action is based at least in part on the comparing of the ASN data to the list of the autonomous system numbers.

12. The computer-implemented method of claim 6, further comprising:

determining a number of instances connected to the IP address over the first time period; and performing the first action or the second action based at least in part on the number of instances connected to the IP address.

13. The computer-implemented method of claim 6, wherein the IP address is a first IP address associated with a service provider network, and the computer-implemented method further comprising:

preventing, based at least in part on the second action, the first IP address from transmitting third data that includes the malicious activity to a computing device associated with the service provider network.

14. The computer-implemented method of claim 6, further comprising:

automatically modifying a setting of a network element of a service provider network to reduce impact of the malicious activity to one or more computing devices interacting with the IP address.

15. The computer-implemented method of claim 6, wherein the first data is received from a decoy device that is configured to detect malicious data from a threat actor.

16. The computer-implemented method of claim 15, wherein:

the decoy device receives the malicious data from the threat actor using a first network of a service provider network, the service provider network comprising a second network to transmit data to a computing device, and the first network is communicatively independent of the second network.

17. One or more non-transitory computer-readable media storing instructions that, when executed, cause one or more processors to perform operations comprising:

receiving first data associated with an internet protocol (IP) address over a first time period;

determining a type of malicious activity in the first data;

determining a number of domain names associated with the first data based at least in part on analyzing a record associated with the first data;

determining one of: a first value indicating that a domain name associated with the first data is included in a list of domain names, or a second value indicating that the domain name associated with the first data is absent from the list of domain names;

performing one of:

a first action, to block the IP address from exchanging second data over a second time period based on the type of malicious activity in the first data, the second value, and the number of domain names associated with the first data meeting or exceeding a domain name threshold; or a second action, to refrain from blocking the IP address from exchanging the second data over the second time period based on the type of malicious activity in the first data, the first value, and the number of domain names associated with the first data being below the domain name threshold.

18. The one or more non-transitory computer-readable media of claim 17, wherein the domain name represents a second-level domain name, the record is a domain resolution record, and the operations further comprising:

querying, based at least in part on receiving the first data, the domain resolution record to identify the domain name associated with the IP address over the first time period, wherein determining the number of domain names associated with the first data is based at least in part on the querying of the domain resolution record.

19. The one or more non-transitory computer-readable media of claim 17, wherein the malicious activity represents a malicious file hosted by the IP address, and the operations further comprising:

determining an initial time at which a computing device received the malicious file;

analyzing third data received a period of time before the time at which the computing device received the malicious file from the IP address; and performing the first action or the second action based at least in part on the analyzing of the third data.

20. The one or more non-transitory computer-readable media of claim 17, the operations further comprising:

determining a network element associated with a service provider network that is configured between the IP address and a computing device; and modifying a setting or parameter of the network element to prevents the IP address from transmitting the malicious activity.

* * * * *